(12) United States Patent
Rupe et al.

(10) Patent No.: US 12,155,525 B1
(45) Date of Patent: Nov. 26, 2024

(54) NETWORK GRAFTING

(71) Applicant: Cable Television Laboratories, Inc., Louisville, CO (US)

(72) Inventors: Jason W. Rupe, Lafayette, CO (US); Curtis D. Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 203 days.

(21) Appl. No.: 17/648,132

(22) Filed: Jan. 16, 2022

Related U.S. Application Data

(63) Continuation of application No. 16/152,472, filed on Oct. 5, 2018, now Pat. No. 11,240,099.

(60) Provisional application No. 62/568,689, filed on Oct. 5, 2017.

(51) Int. Cl.
*H04L 41/0659* (2022.01)
*H04L 41/0896* (2022.01)
*H04L 41/12* (2022.01)
*H04L 43/12* (2022.01)

(52) U.S. Cl.
CPC .......... *H04L 41/0661* (2023.05); *H04L 41/12* (2013.01); *H04L 43/12* (2013.01); *H04L 41/0896* (2013.01)

(58) Field of Classification Search
CPC ..... H04L 12/24; H04L 41/0672; H04L 41/12; A61K 31/454; A61F 2/00
See application file for complete search history.

(56) References Cited

U.S. PATENT DOCUMENTS

| | | | |
|---|---|---|---|
| 6,931,005 B1* | 8/2005 | Wilhelm | H04L 47/10 370/408 |
| 8,774,059 B2* | 7/2014 | Muller | H04L 12/185 370/348 |
| 2016/0112734 A1 | 4/2016 | Williams et al. | |
| 2018/0270698 A1* | 9/2018 | Babaei | H04W 72/21 |
| 2019/0007496 A1 | 1/2019 | Khanna et al. | |
| 2019/0097890 A1 | 3/2019 | Zhang et al. | |

* cited by examiner

*Primary Examiner* — Iqbal Zaidi
(74) *Attorney, Agent, or Firm* — PdZ Patent Law, PLLC

(57) ABSTRACT

Grafting segments of a network together to mitigate service disruptions associated with impairments, maintenance, etc., is contemplated. The grafting may include instantiating a wired and/or wireless graft to facilitate connecting an impaired portion of a network to an unimpaired portion, such as to reestablish services at the impaired portion via the graft to the unimpaired portion.

14 Claims, 4 Drawing Sheets

NETWORK GRAFTING

CROSS-REFERENCE TO RELATED APPLICATIONS

This application is a continuation of U.S. patent application Ser. No. 16/152,472, filed on Oct. 5, 2018, which claims the benefit of U.S. provisional patent application No. 62/568,689, filed on Oct. 5, 2017. Each of the aforementioned patent applications is incorporated in its entirety by reference herein.

TECHNICAL FIELD

The present invention relates to grafting segments of a network together to mitigate service disruptions associated with impairments, maintenance, etc., such as but not necessarily limited to grafting the segments together with a wired and/or wireless graft.

BACKGROUND

A network may include any number of interconnecting paths, branches, segments or other wired and/or wireless mediums to facilitate signaling thereover. A particular arrangement or interconnectedness of the network, i.e., the paths, branches, segments, etc. therein, may be defined according to a topology, such as according to an opened-loop or a closed-loop topology. The opened-loop topology may be characterized as defining the interconnectedness of the network such that signals may be capable of being split without being rejoined or without being communicated in a circular manner. The closed-loop topology may be characterized as defining the interconnectedness of the network such that signals may be capable of being rejoined or capable of being communicated in a circular manner. A tree-branch topology is one example of an opened-loop topology whereby the interconnectedness of the network may be defined according to a plurality of branches extending from a tree, trunk or other origination point such that each branch thereafter splits into another branch without the associated signaling path rejoining or circularly connecting to another branch. The tree-branch topology may be beneficial in facilitating signaling without being subjected to echoes, attenuations or other signaling impairments found in closed looped topologies as result of the signals being rejoined or circular.

A tree-branch and/or other opened-loop topology may be vulnerable to signaling disruptions, loss of service or other difficulties when a branch is impaired due to noise, maintenance, breach, severing, etc. as such topologies may be unable to sufficiently facilitate signaling with portions of a branch separated by an impairment. One non-limiting aspect of the present invention contemplates addressing such vulnerabilities of tree-branch and/or other opened-loop topologies, such as to maintain services and/or mitigate the scope of a disruption when a branch may be impaired.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
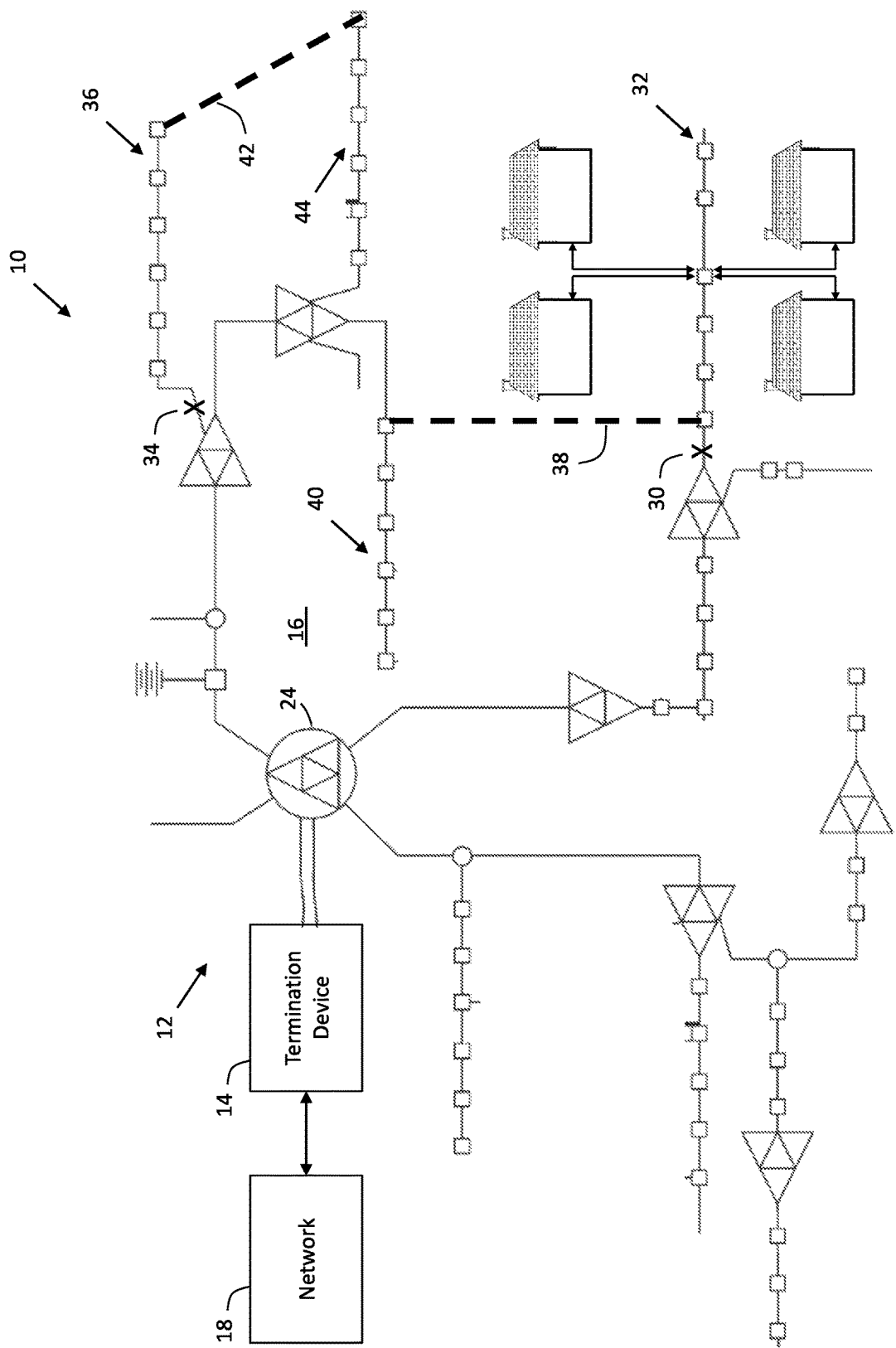
FIG. 1 illustrates a system for network grafting in accordance with one non-limiting aspect of the present invention.

FIG. 1 illustrates a system 10 for network grafting in accordance with one non-limiting aspect of the present invention. The system 10 may be used to facilitate grafting in a network 12 of any type and is predominant described with respect to facilitating grafting in a network having a tree-branch topology whereby a plurality of branches facilitate exchanging signaling between a termination device 14 and any number of clients over a bounded medium 16. The network 12 may be configured to facilitate transport of virtually any type of signaling, including signaling associated with a multiple system operator (MSO), such as but not necessarily limited to a cable, satellite, or broadcast television service provider, a cellular service provider, and high-speed data service provider, an Internet service provider (ISP), etc. and according to virtually any networking protocol. The network 12 may utilize any combination of wired and/or wireless signaling to facilitate the signal exchange and is illustrated as at least partially including the bounded medium 16 to facilitate signal exchange between the termination device 14 and a plurality of taps (shown as boxes). The taps may be access points or other connections whereby the clients, e.g., devices, endpoints, access points, gateways, settop boxes (STBs), televisions, phones, enodeBs, terminals, etc., connect to the bounded medium 16 to facilitate exchanging signals with the termination device 14. The termination device 14 may be any device tasked with terminating signaling carried over the bounded medium 16 and/or facilitating further signal exchanged in the illustrated manner with an additional network 18.

The network 12 may be a cable network, such as one operating in accordance with Data-Over-Cable Service Interface Specifications, DOCSIS 3.1, Physical Layer Specification, CM-SP-PHYv3.1-114-180509, the disclosure of which is hereby incorporated in its entirety by reference herein, whereby the termination device 14 may be a cable modem termination system (CMTS) and/or headend tasked with facilitating signaling with cable modems (CMs) or other devices connected through one or more of the taps. The signaling may travel through the bounded medium 16 in the manner described in U.S. patent application Ser. No. 14/181,645, entitled Multiple-Input-Multiple-Output (MIMO) Communication System, the disclosure of which is hereby incorporated by reference in its entirety, whereby one or more optical fibers cooperate with a fiber node 24 and a cable television distribution system having a plurality of coaxial cables to facilitate exchanging signals with a plurality of taps, optionally with use of splitters and/or amplifiers (shown as triangles and circles). The taps may be of any construction sufficient to facilitate exchanging signaling with clients, CMs, etc. connected thereto, i.e. the taps may include capabilities to facilitate splitting/routing signaling therethrough and/or additional capabilities to facilitate intelligent operations, such as in the case of the taps described in U.S. provisional application Nos. 62/569,308, 62/618,429, 62/678,123 and 62/731,587, the disclosures of which are hereby incorporated in their entireties by reference herein, and/or other such smart taps having capabilities sufficient to facilitate switching, attenuating or otherwise adjusting signaling passing therethrough.

The tree-branch topology may be characterized by a signal being limited to traveling in one direction, i.e., without returning to a source, absent an impairment or other disruption in the network that causes an echo, signal reflection or circularity through a corresponding return path. The tree-branch topology may be considered as an opened-loop topology in that the interconnectedness of the network 12, i.e., its branches, may be defined according to split from a tree, trunk or other origination point, e.g. the termination device 14, such that each branch thereafter splits into another branch without the associated signaling path rejoining or circularly connecting to another branch (each split may demarcate an additional branch). FIG. 1 illustrates a first impairment 30 affecting a first branch 32 and a second impairment 34 affecting a second branch 36. The first and second impairments 30, 34 may be associated with any number of events sufficient to prevent signaling from properly traversing the area influenced by the impairment, such as when the corresponding branch 32, 36 is impaired due to noise, maintenance, breach, severing, etc. The impairment 30, 34 may separate or divide the associated branch 32, 36 such that a portion of the branch 32, 36 may be characterized as unimpaired and a portion of the branch 32, 36 may be characterized as impaired. The portions of the branch illustrated as leftward of the Xs may be considered as the unimpaired portion of the corresponding branch 32, 36 due to it maintaining sufficient connectivity to the termination device 14 whereby the portions of the branch illustrated as rightward of the Xs may be considered as the impaired portion of the corresponding branch due 32, 36 to it lacking sufficient connectivity to the termination device 14.

One non-limiting aspect of the present invention contemplates compensating for impairments, impediments or other signal disruptions by grafting some or all of the impaired portion of the corresponding branch to another branch, such as to maintain services and/or mitigate the scope of a disruption to customers connected to the impaired portions. A graft, such as but not necessarily limited to a wired and/or wireless graft, may be utilized to facilitate grafting one branch to another in a manner sufficient to facilitate bidirectional signal exchange therebetween. A first graft 38 may be used to facilitate grafting the first branch 32 to a third branch 40 such that the impaired portion of the first branch 32 may be connected to the third branch 40 to maintain connectivity. The first graft 38 may be positioned without altering a directionality of the signaling being exchanged over the impaired portion, i.e., the directionality of upstream/downstream signaling through the impaired portion of the first branch 32 may unaffected by the first graft 38. A second graft 42 may be used to facilitate grafting the second branch 36 to a fourth branch 44 such that the impaired portion of the second branch 36 may be connected to the fourth branch 44 to maintain connectivity. The second graft 42 may be positioned to alter a directionality of the signaling being exchanged over the impaired portion, i.e., the directionality of upstream/downstream signaling through the impaired portion of the second branch 36 may be affected by the second graft 42. The directionality of upstream/downstream signaling may be reversed with the second graft 42 due to an end of the second branch 36 being connected to the fourth branch 44. While a beginning of the second branch 36 closest to the second impairment 34 could be grafted to the fourth branch without reversing the directionality, the illustrated second graft 42 demonstrates one scenario where availability limitations on the grafting may require a reversal of signal directionality.

The termination device 14, an RF detector attached to one or more of the branches, a smart tap or other feature having capabilities sufficient to detect an impairment may trigger a grafting process to create a graft. Proactive network maintenance (PNM), such as but not necessarily limited to that described in the DOCSIS 3.1 specification referenced above, may be utilized to assess impairments or other conditions requiring grafting. The grafting process may include assessing locations available for instantiating a graft consistent with the topology of the network 12, e.g., locations whereby the attendant graft may be sufficient to maintain integrity of the tree-branch topology after instantiation. In the case of a wired graft, the location assessment may include determining whether auxiliary optical fibers, coaxial cable, power lines, telephone lines or other wired mediums may be available between branches and/or locations having taps, switches, amplifiers, relays, etc. capable of being opened/closed to facilitate interconnecting branches via a graft. In the case of a wireless graft, the location assessment may include determining taps, CMs, etc. having capabilities sufficient to facilitate wireless signaling with another branch. The grafting process may also include assessing signaling requirements needed to maintain integrity of the network topology following the grafting, which may include adjusting power, gain, attenuation or other signaling influences in the branches associated with a graft to ensure integrity of the signaling therethrough, i.e., to compensate for the branch length changing, additional taps and/or devices being connected, etc.

When designing in a graft to an architecture, a downstream direction of each end of the graft may be examined. If the assumed downstream and upstream levels are such that there may be a significant difference, one of the following adjustments may be made: 1) attenuating the stronger upstream/downstream signal so that both sides, i.e., each end of the graft, may be closely balanced; 2) placing an amplifier in the upstream and/or downstream directions to amplify the low power signal in the event of grafting on a lower power and/or 3) reversing directionality operations at the tap/devices associated with the branch being grafted in a reversed order. With respect to the first impairment illustrated in FIG. 1, the grafting process may include protecting the downstream CMs or other devices in the event of a temporary isolation or loss of registration with the CMTS. When a technician approves and repairs the impairment, if needed, the technician can disconnect the graft, or a signal being used to instantiate the graft, to allow the switch or other mechanism connecting the graft to return back to the primary path of the tree, thus causing the graft to open. If adjustments are impractical or otherwise failed to occur, some of the connected devices may appear louder than others, which can cancel out signaling, such that the application and/or attenuation may be beneficial in ameliorating such effects. If those adjustments fail, then the CMTS and CMs or other device may be required to do their best to connect, which may mean some CMs receive lower data rates and/or an unable to connect to the CMTS register.

A smart tap, RF detector, etc. could be used to switch off a link and on a graft based on poor PNM performance including a suck-out, high noise floor, ingress, etc. This could be triggered automatically by the indication of the impairment within an application, or within a network monitoring device. It could also be done manually when indicated. If performance improves, a technician can be dispatched to find the problem in the disconnected section, which may improve troubleshooting by isolating plant problems remotely. If performance did not improve, the impairment may be isolated to the branch that was grafted, thus improving troubleshooting. If the performance did not improve, the switch can be reversed to the first state. If there are additional grafts that are upstream or downstream to the affected modems, in the direction of the impairment, then additional switching could be considered to further isolate the problem and keep services running. The location, construction, capabilities, required adjustments and other variables attendant to maintaining integrity of the network following a grafting may vary depending on the taps, switches, relays, etc. facilitating the graft as well as a signaling capabilities or requirements of the devices communicating their over. One non-limiting aspect of the present invention contemplates predefining or otherwise specifying prior to graft instantiation the parameters needed to facilitate connecting pre-planned graphs between branches, which may be beneficial in limiting processing and other operations occurring after a graft to maintain network integrity.

A wired graft, i.e., one utilizing an optical fiber, coaxial cable, a power line or other bounded medium to facilitate signaling exchange, may require the corresponding infrastructure to be provided within the network prior to determining a need for grafting. The wired grafts may correspond with auxiliary or unconnected features placed throughout the network in anticipation of impairments, optionally with aforethought of the signaling adjustments needed to facilitate the use thereof, such that the location and placement of the grafts may be preplanned and/or static. The switches, taps, etc. associated therewith may be pre-loaded with instructions sufficient for implementing adjustments needed to compensate for being grafted and/or to otherwise automatically initiate operations contemplated herein to instantiate a graft and to maintain network integrity thereafter. A wireless graft, i.e., one created through LTE, Wi-Fi or other wireless signaling, may require less pre-planning and optionally deployed through smart taps or other wireless communication devices, such as CMs, within the network. Adjustments needed to facilitate integrity of the network for signals being carried wirelessly thereover may require the communicating device to assess interference, licensed frequencies, etc. to ensure viability of the graft.

Figure 2:
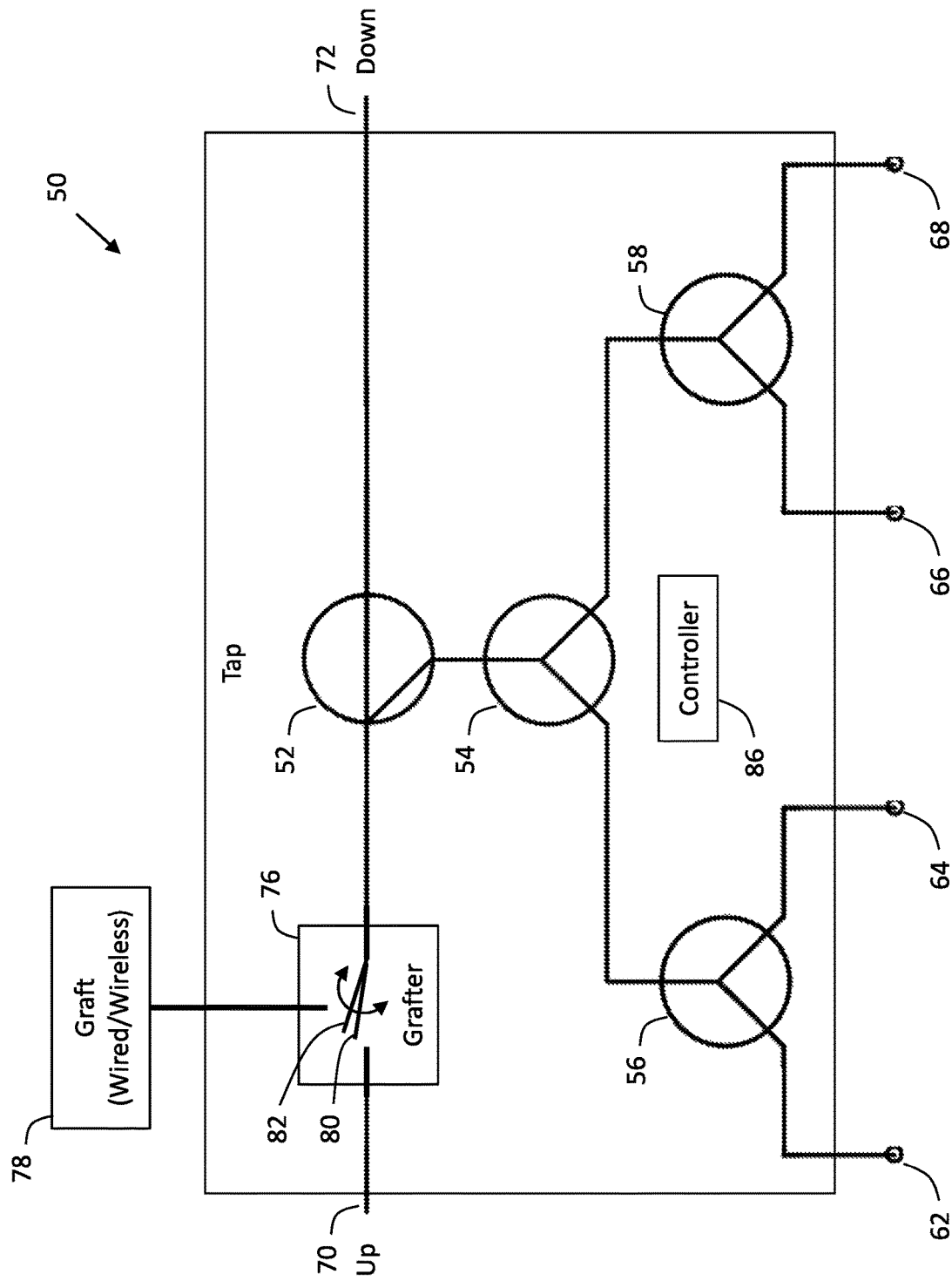
FIG. 2 schematically illustrates a tap in accordance with one non-limiting aspect of the present invention.

FIG. 2 schematically illustrates a tap 50 in accordance with one non-limiting aspect of the present invention. The tap 50 may correspond with one of the taps illustrated in FIG. 1 and include one or more switches (not shown) to facilitate blocking signaling and correspondingly mitigating noise. The tap 50 is shown as including four splitters 52, 54, 56, 58 to facilitate multiple signaling paths sufficient to establish connectivity between a connected-to branch/neighboring taps and four client ports 62, 64, 66, 68. The illustrated tap 50 is exemplary of one type of tap that provides one or more client ports 62, 64, 66, 68 for connecting to client devices and an input port 70 and an output port 72 to facilitate communications between neighboring taps on the connected-to branch. A first splitter 52 may facilitate exchanging signaling via the input port 70 with another, upstream tap and with another, downstream tap via the output port 72. Three additional splitters 54, 56, 58 may be included to facilitate exchanging signaling between the input port 70 and the four client ports 62, 64, 66, 68. While the present invention contemplates the tap 50 including more or less client ports 62, 64, 66, 68 and/or additional ports 70, 72 to facilitating connecting to more neighboring taps and/or branches, the illustrated tap 50 is exemplary of one non-limiting aspect of the present invention whereby splitters 52, 54, 56, 58 or other features may be included in the taps to facilitating connecting clients the network via one of the branches.

The tap 50 may include a grafter 76 to facilitate establishing a graft 78 with another branch or other location in the network 12. The grafter 76 may include capabilities sufficient to facilitate exchanging signaling with one or all of the upstream port 70, the downstream port 72 and the graft 78. A first switch 80 may be used for interconnecting the upstream port 70 with the first splitter 52 and a second switch 82 may be used for interconnecting the graft 78 with the first splitter 52. The first and second switches 80, 82 may be independently controllable such that the first splitter 52 may be connected to the upstream port 70 when the first switch 80 is closed, disconnected from the upstream port 70 when the first switch 80 is opened, connected to the graft 78 when the second switch 82 is closed, disconnected from the graft 78 when the second switch 82 is opened, connected to both of the upstream port 70 and the graft 78 when the first and second switches 80, 82 are closed, and disconnected from both of the upstream port 70 and the graft 78 when the first and second switches 80, 82 are opened. The tap 50 may include a controller 86 to facilitate corresponding control of the grafter 76 and/or other operations of the tap 50, such as in response to wired and/or wireless control messages transmitted thereto and/or according to detection processes or operations undertaken at the tap 50 to assess impairments or conditions requiring use of the graft 78. The controller 86 may optionally include instructions or capabilities sufficient to facilitate usage of the graft 78 according to wired and/or wireless configuration of the graft 78, i.e., to facilitate adjusting gain, attenuation and other aspects of the tap 50 or other devices in the branch needed to maintain network integrity following instantiation of the graft.

Figure 3:
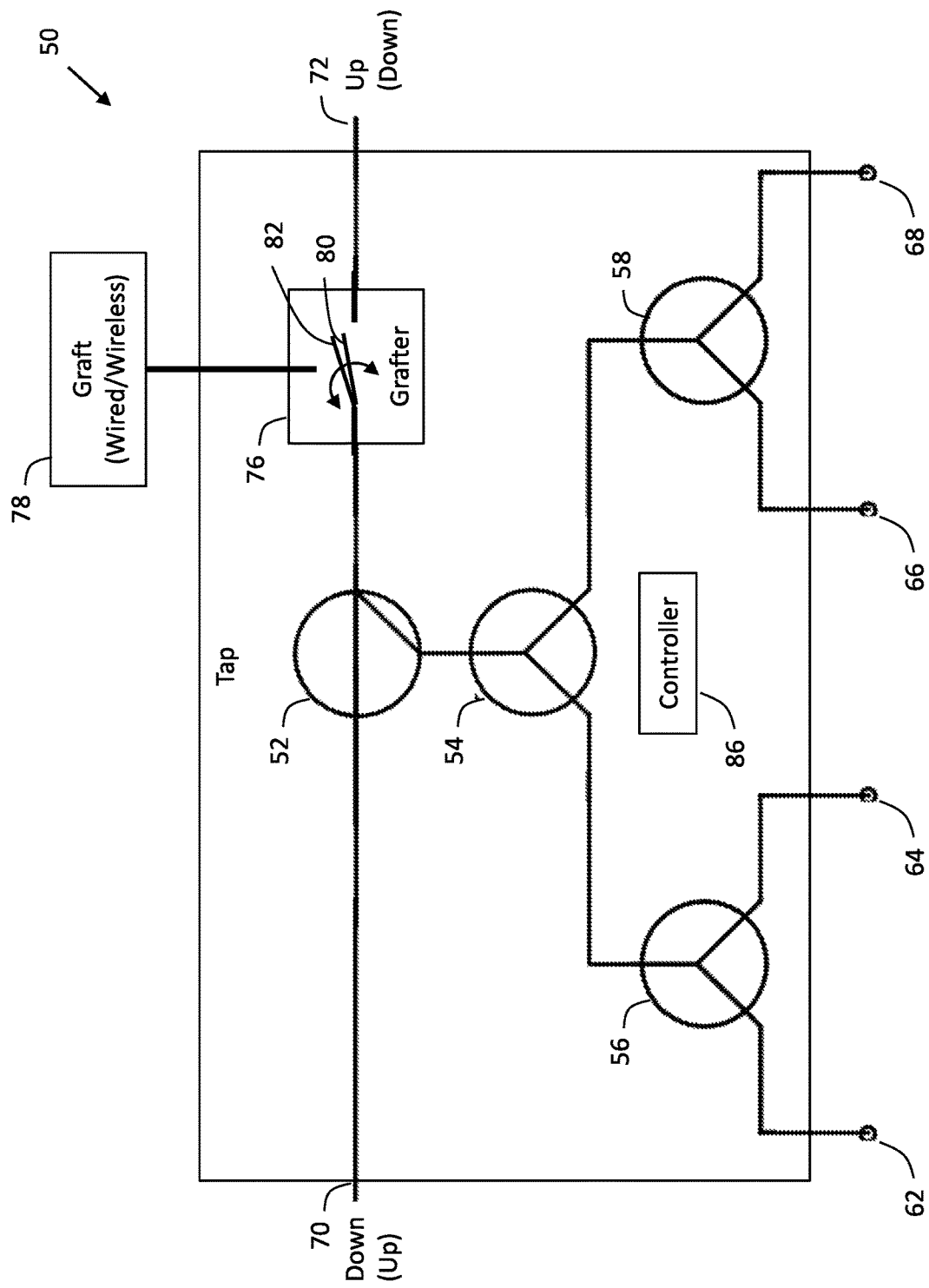
FIG. 3 schematically illustrates a tap having reversed directionality in accordance with one non-limiting aspect of the present invention.

In the event of the first graft 38 illustrated in FIG. 1 being established between two taps having the capabilities described in FIG. 2, the tap connected to the first branch 32 may include the corresponding grafter 76 actuating the first switch 80 from its normally closed position to the opened position to disconnect from the first impairment 30. The second switch 82 may be actuated from its normally opened position to the closed position to connect with the first graft 38. The tap connected to the second branch 40 may include the corresponding grafter 76 keeping the first switch 80 in its normally closed position and actuating the second switch 82 from the normally open position to the closed position to connect with the first graft 38. In the event of the second graft 42 illustrated in FIG. 1 being established between two taps having the capabilities described in FIG. 2, the tap connected to the second branch 36 may be required to reverse its directionality in order to compensate for upstream/downstream signaling directions being reversed due to the graft 42 being instantiated at what was previously a downstream port of the tap connected to the second branch 36. FIG. 3 schematically illustrates the tap 50 having reversed directionality in accordance with one non-limiting aspect of the present invention. The reverse directionality may correspond with the controller 86 reversing a directionality of the first splitter 52 to accommodate the previous upstream port 70 becoming a downstream port and the previous downstream port 72 becoming an upstream port in order to connect via the second graft 42 to a downstream port of the tap on the fourth branch 44.

FIGS. 2 and 3 schematically illustrate the capabilities of the tap 50 to connect with the graft 78 as the present invention contemplates various circuitries being capable of facilitating the contemplated operations. Use of the taps to facilitate the grafting is described for exemplary non-limiting purposes as the present invention fully contemplates using other componentry available within the network 12 to facilitate the grafting, i.e., grafting independently of the taps. One non-limiting aspect of the present invention contemplates adding wired and/or wireless capabilities to a network to facilitate establishing backup connections between branches at locations independent of the taps, such as at amplifiers, splitters, nodes or other features included in the network to facilitate signaling independently of the taps. These non-tap type of devices may be included in a network at the time of constructions and/or added thereafter to facilitate utilizing power lines, cellular towers, telephone lines, fiber or other infrastructure to create a graft between branches. The illustrated grafts are shown as linear connections between two branches for exemplary purposes as multiple grafts may interconnect, such as according to a tree-branch topology, such that more than one graft may be utilized to facilitate connecting to one or more branches together.

Figure 4:
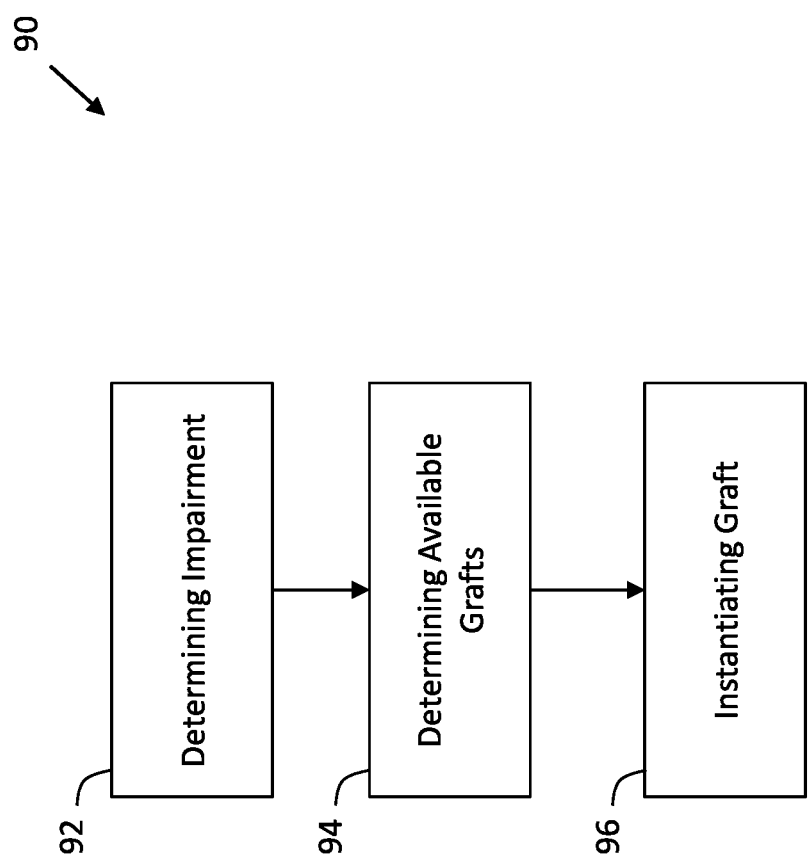
FIG. 4 illustrates a flowchart for a method of network grafting in accordance with one non-limiting aspect of the present invention.

FIG. 4 illustrates a flowchart 90 for a method of network grafting in accordance with one non-limiting aspect of the present invention. The operations, processes, controls and other logic associated with the method may be facilitated with processor execution of corresponding instructions stored on a non-transitory computer readable medium, such as one associated with the taps, the termination device 14 and/or other device in the network 12 capable of facilitating implementation of a graft in the event of an impairment or other need. Block 92 relates to determining an impairment or other event whereby signaling or other disruptions may occur in one of the branches to require grafting to another branch in order to maintain desired levels of signaling or service. The impairment decision may include assessing an impaired and an unimpaired portion of a branch, i.e., a location of the impairment and/or portions of the corresponding branch receiving adequate signaling and those receiving inadequate signaling. Block 94 relates to determining available grafts to compensate for the impairment, such as assessing wired and/or wireless capabilities in the area of the impairment capable of facilitating one or more grafts between the impaired portion and another branch. Block 96 relates to instantiating one or more of the available grafts, which may include returning service to some or all of the impaired portion depending on the topology of the graft relative to the network and making corresponding signaling adjustments to the amplifiers, splitters, etc. associated therewith for purposes of maintaining network integrity after each graft is operational.

As supported above, one non-limiting aspect of the present invention contemplate introducing switching technologies to key parts of a network to bridge and share capacity. When a cable or other communication medium of the network is cut, the switch can send traffic through a graph to another branch or path in the network. When capacity is constrained, the capacity can be shared, potentially providing more bandwidth for services all the time. Wide Orbit Wi-Fi, dedicated optical links, line of sight optical, LTE small cells, System Architecture Evolution (SAE), or packet switching, and/or taps, amplifier-attenuators or repeaters having capabilities sufficient to facilitate grafting to another signal path or branch in the network may be employed. The switch points may be introduced virtually anywhere in a tree-branch topology sufficient to avoid generating circles or loops with the corresponding locations optionally taking advantage of neighboring trees that may close so that link distances can be minimal, right of way can be accessible and/or power can be accessed/shared if needed. Switching and coax or fiber links can be used to bridge two CMTS, RPD, CCAP, Nodes, Amps, or even taps in a distribution network and/or end user modems, or special purpose modems added to taps, could be utilized. LTE Small Cells or Wide Orbit Wi-Fi can be installed to bridge two networks, optionally in an ad-hoc manner, such that sharing of load between multiple points can be done to fill the needs of a node on a failed feed.

A customer's drop being cut could be survived for the maintenance duration by having their modem borrow capacity from neighboring modems through creation of a temporary mesh. Because there may be a vast number of architectures for HFC or other networks constrained to a tree-branch topology or similar prohibition on circles or loops, it can be difficult to define all possible instantiations, but any graft may be used to bridge a connection from one tree to another when the tree's main trunk of communication is lost. The DOCSIS type of HFC network includes a tree structure for at least the analog portion, such that the present invention can be used therewith, optionally through associated PN and capabilities, to, whenever a branch (sub-tree) is severed from the larger structure (network), switch or otherwise activate a standby connection to re-connect that severed branch to either the same network in a different way, or a different portion of the network via a different path, or a different network (tree) altogether. A connection between distribution hubs, either coax or fiber as the case may be, can be introduced so that if the feed from one is lost, it can gain connectivity through its neighbor hub. Such may require APS in the optical solutions, or a combination of amplifiers and smart taps in the coax solution. A connection between amps, or between an amp and a tap, could also be established. The amp in this case would be able to adjust to the new loss levels, but a pre-computed level could make this a faster adjustment at failure. A switching mechanism, such as a layer 2-3 switch, or a smart tap could be used to handle the protection switch at failure. Between taps, the same approach as above could be done, and if an amplifier would be needed to get the right analog levels set, then it could be introduced on the link between the two taps. Dual drops may be introduced to a single end customer, with a simple fail-over switch between the two connections and/or a link between two end customers could allow a branch between networks, backup connection from one small sub-tree to another, or form a ring between a tap and two customers. Some fair sharing of channels, or pass through of traffic, would be needed.

With PNM capabilities now a part of D3.1, we can manage toward a future where Full Band Capture can reveal bandwidth problems, which can trigger the proposed solution to re-allocate and efficiently share bandwidth in complicated cases and/or to connect to new branches when impairments occur. The proposed solution can allow a hard failure to be worked around, and bandwidth on a backup path shared with the primary traffic in a way to serve all customers best. Today, on a broadcast channel, impairments can make a certain channel unwatchable, but the present invention could be used to support the channel frequency from the alternate source path and keep the channel watchable. Due to the tree-like structure of HFC plant, a single cut or impairment or failure in the network can immediately impact a large number of customers on a single point of failure, making service reliability a challenge. In addition, capacity constraints will become a challenge, and the tree-like architecture makes for less flexibility in capacity management. This approach offers a solution to the node split, which doesn't carry the same advantages as this mesh sharing approach, and from a capacity exhaust alternative, node splits and similar options failed to solve the reliability issues and are not as robust to uncertain customer usage variability. Nodes could be put in a ring, which would be another instantiation of the present invention, but doing so may require amplifiers to work bidirectionally and switching to be triggered by loss of signal, which may result in forming a DOCSIS (analog) ring like an Ethernet Ring, or SONET UPSR or BLSR for examples.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for troubleshooting a communication network including a plurality of interconnected branches, the method comprising:
   detecting an impairment in a first physical branch of the plurality of interconnected branches, the impairment being caused by one or more of damage to the first physical branch, maintenance being performed on the first physical branch, and severing of the first physical branch; and
   in response to detecting the impairment:
      grafting the first physical branch with a second physical branch of the plurality of branches at least partially by closing a switch communicatively coupling the first physical branch and the second physical branch, and
      isolating a first portion of the first physical branch from a second portion of the first physical branch.

2. A method for troubleshooting a communication network including a plurality of interconnected branches, the method comprising:
   detecting an impairment in a first branch of the plurality of interconnected branches;
   in response to detecting the impairment:
      grafting the first branch with a second branch of the plurality of branches, and
      isolating a first portion of the first physical branch from a second portion of the first physical branch; and
      adjusting one or more of power, gain, and attenuation of one or more devices in the communication network to at least partially compensate for signaling variances resulting from grafting the first branch with the second branch.

3. The method of claim 1, further comprising detecting the impairment in response to poor communication network performance associated with the first physical branch.

4. The method of claim 1, further comprising detecting the impairment using at least one of an application operating in the communication network, a network monitoring device, a radio frequency detector, and a tap.

5. The method of claim 1, wherein the impairment is selected from the group consisting of a suck-out, a high noise floor, and ingress.

6. A method for troubleshooting a communication network including a plurality of interconnected branches, the method comprising:
   detecting an impairment in a first branch of the plurality of interconnected branches; and
   in response to detecting the impairment:
      grafting the first branch with a second branch of the plurality of branches, and
      isolating a first portion of the first branch from a second portion of the first branch;
   wherein grafting the first branch with the second branch comprises communicatively coupling the first branch with the second branch via one or more of an optical communication link, a wireless communication link, and an electrical cable communication link.

7. The method of claim 1, wherein isolating the first portion of the first physical branch from the second portion of the first physical branch comprises opening a switching device in the first physical branch.

8. A method for grafting branches in a communication network including a plurality of interconnected branches, the method comprising:
   operating the communication network in a first operating state that prevents communication between a first branch of the plurality of branches and a second branch of the plurality of branches;
   detecting an impairment in the first branch;
   in response to detecting the impairment, operating the communication network in a second operating state that permits communication between the first branch and the second branch, the communication between the first branch and the second branch in the second operating state including bidirectional communication; and
   while operating the communication network in the second operating state, preventing communication between an impaired portion of the first branch and an unimpaired portion of the first branch.

9. The method of claim 8, further comprising detecting the impairment in response to poor communication network performance associated with the first branch.

10. The method of claim 8, further comprising detecting the impairment using at least one of an application operating in the communication network, a network monitoring device, a radio frequency detector, and a tap.

11. The method of claim 8, wherein the impairment is caused by one or more of damage to the first branch, maintenance being performed on the first branch, and severing of the first branch.

12. A system for grafting a communication network including a plurality of interconnected branches, comprising:
   a first element configured to detect an impairment in a first branch of the plurality of interconnected branches; and
   a grafting device configured to (a) graft the first branch with a second branch of the plurality of branches, in response to the first element detecting the impairment, and (b) isolate a first portion of the first branch from a second portion of the first branch, in response to the first element detecting the impairment;
   wherein the grafting device includes a switching device configured to selectively communicatively couple a first portion of the first branch and a second portion of the first branch.

13. The system of claim 12, wherein the grafting device further comprises a switching device configured to selectively communicatively couple the first branch with the second branch.

14. The system of claim 12, wherein the first element comprises one or more of an application operating in the communication network, a network monitoring device, a radio frequency detector, and a tap.

* * * * *